United States Patent [19]

Avignon et al.

[11] Patent Number: 5,332,998
[45] Date of Patent: Jul. 26, 1994

[54] PROCEDURE FOR DETECTION AND LOCALIZATION OF OBJECTS ON RELATIVELY FLAT GROUND AND A DEVICE FOR APPLICATION OF THE PROCEDURE

[75] Inventors: Bruno Avignon, Palaiseau; Yves Canal, Antony, both of France

[73] Assignee: Thomson-CSF, Puteaux, France

[21] Appl. No.: 53,654

[22] Filed: Apr. 29, 1993

[30] Foreign Application Priority Data

Apr. 30, 1992 [FR] France .................. 92 05370

[51] Int. Cl.5 ............................................. G01S 13/89
[52] U.S. Cl. ........................................ 342/64; 342/65; 342/191
[58] Field of Search ................. 342/64, 65, 96, 120, 342/135, 190, 191, 133, 146, 25

[56] References Cited

U.S. PATENT DOCUMENTS

| | | | |
|---|---|---|---|
| 3,573,825 | 4/1971 | Westby | 342/120 |
| 3,680,086 | 7/1972 | Valstar | 342/81 |
| 3,706,988 | 12/1972 | Bayle et al. | 342/52 |
| 3,739,380 | 6/1973 | Burdic et al. | 342/65 |
| 4,646,244 | 2/1987 | Bateman et al. | 364/461 |
| 4,849,756 | 7/1989 | Bateman | 340/970 |
| 4,894,659 | 1/1990 | Andrews | 342/121 |
| 4,897,660 | 1/1990 | Gold et al. | 342/192 |
| 4,912,474 | 3/1990 | Paturel et al. | 342/191 |
| 4,939,513 | 7/1990 | Paterson et al. | 340/970 |
| 5,047,779 | 9/1991 | Hager | 342/120 |
| 5,170,171 | 12/1992 | Brown | 342/191 |

FOREIGN PATENT DOCUMENTS 3919573 12/1990 Denmark .
2548774 1/1985 France .
0459886 12/1991 France .

OTHER PUBLICATIONS

Proceedings of the IEEE, vol. 70, No. 12, Dec. 1982, Radar Signatures of Terrain . . . , pp. 1410–1428, Fawwaz T. Ulaby.

Primary Examiner—John B. Sotomayor
Attorney, Agent, or Firm—Oblon, Spivak, McClelland, Maier & Neustadt

[57] ABSTRACT

A detection and localization system mounted on an airborne vehicle, and which enables detection of objects having at least one face inclined relative to the surrounding flat horizontal ground and therefore presenting a contrast with this ground. A radar transceiver is connected to an antenna rotating around the airborne vehicle and has a low directivity in a pitch plane and a high directivity in a roll plane, associated with a generator of distance cells. Making use of mathematical relations, an on-board computer, knowing the altitude of the airborne vehicle and the roll angle of the emitted radar wave, localizes the inclined face which produces a much higher reflection of the emitted radar wave than the surrounding ground, to thereby detect the inclined face.

10 Claims, 5 Drawing Sheets

5,332,998

PROCEDURE FOR DETECTION AND LOCALIZATION OF OBJECTS ON RELATIVELY FLAT GROUND AND A DEVICE FOR APPLICATION OF THE PROCEDURE

BACKGROUND OF THE INVENTION

The present invention concerns a procedure for detection and localization of objects on relatively flat ground and a device for application of the procedure.

In order to detect objects such as vehicles or buildings on relatively flat ground one possible approach is photographic comparison: photographs of known ground, in the absence of these objects, obtained by satellite or aerial photography for example, are compared with images obtained later in order to detect the arrival of the objects. Another method is simply to try to detect the objects on any photograph available.

The first approach requires prior reconnaissance of the ground in question and very precise guidance of the observation aircraft (by means of inertial guidance systems, for example). Not only is preliminary aerial observation sometimes impossible, but the survey must be made not too long in advance of the final photographic survey. Furthermore, the problems of localization necessitate complex and costly means, such as gyroscopes.

The second approach involves analysing an image of the ground in real time using shape recognition algorithms in order to locate certain types of objects. This procedure is complex and requires powerful data processing means.

Moreover, these procedures do not enable the distance from the aircraft to a target object to be measured nor the time of arrival of the object to be calculated, a disadvantage in the case where the guidance system is supposed to bring the aircraft directly over the object.

SUMMARY OF THE INVENTION

The present invention presents a procedure for detection by an airborne vehicle of objects on relatively flat ground which is simple to use, requires no preliminary reconnaissance of the ground nor powerful data processing facilities, yet enables objects to be located with precision.

The invention also includes a device making use of this procedure, which is simple, inexpensive and easily installed in an airborne vehicle.

The procedure according to the invention used for the detection and localization of objects surrounded by a substantially flat surface and having at least one substantially flat face inclined at an angle of more than about 10° with respect to the flat surface, applied by an airborne vehicle over-flying the flat surface, consists in scanning the surface in front of the airborne vehicle with an electromagnetic wave, analysing the fluctuations of the reflected signal, selecting for each angle of incidence of the scanning wave a range of distances centered on a value equal to the height of the vehicle divided by the cosine of the angle of incidence (measured from the vertical), and analysing in this range of distances the intensity of the wave reflected by the scanned surface, and when the maximum intensity of the reflected wave exceeds a determined threshold, significantly greater than that generally measured for the wave when it is reflected from the surrounding surface at the same angle of incidence, determining the distance and azimuth of the reflecting face, corresponding to the measured maximum.

BRIEF DESCRIPTION OF THE DRAWINGS

The present invention will be better understood on reading the following description of an embodiment, taken as a non-restrictive example, with reference to the attached drawings which represent.

DESCRIPTION OF THE INVENTION

The invention is described below making reference to an embodiment concerning the localization of a target by an airborne vehicle which is a munition such as a cargo bomb, with a view to correcting the trajectory of this vehicle, if necessary, to enable it to pass as close as possible to the target (terminal guidance). However, the invention is in no way limited to such an application: it can be used for detection only or for relatively precise detection and localization. It should also be noted that the "objects" to be detected and possibly localized may not be objects placed on or fixed to the ground, but variations of relief of the ground or formations projecting from the ground or hollows in the ground. The essential feature of all "objects" as regards this invention is that they have at least one face inclined with respect to the surrounding ground and that the objects to be located have at least one face whose normal is oriented into the semi-infinite space containing the airborne vehicle.

Figure 1:
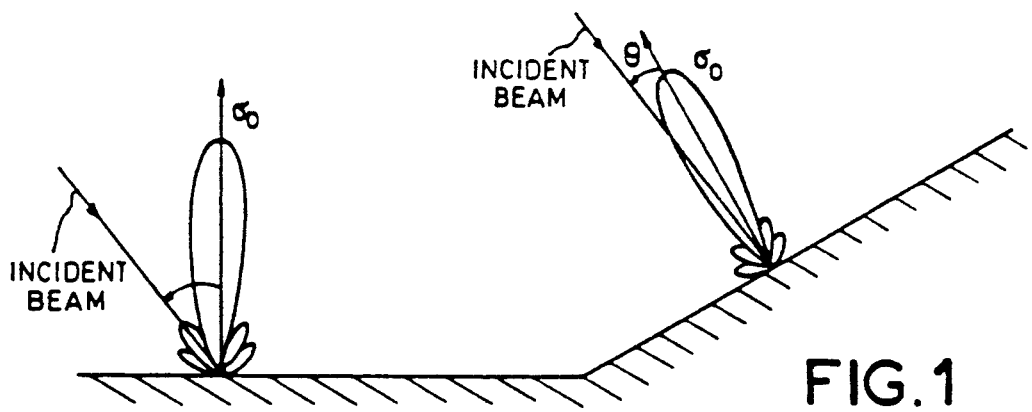
FIG. 1: a general diagram explaining the physical phenomena providing the basis of the procedure according to the invention.

FIG. 1 shows polar diagrams of reflection of a radar beam from a flat, horizontal surface (diagram on the left) and from an inclined surface (diagram on the right), the incident radar beam being inclined at 35° to 45° to the vertical. In the case of the horizontal surface the reflected wave displays a strong maximum in the vertical direction and rapid attenuation away from the vertical; the main lobe 2 is symmetric about the vertical. The reflected wave also has secondary lobes such as 3 and 4 and their symmetric counterparts on the other side of the vertical. These secondary lobes are much smaller than the main lobe. Consequently, the wave reflected along the direction of incidence is much weaker than the maximum of lobe 2.

In the case of the surface inclined at 30°, for example, to the horizontal (diagram on the right of FIG. 1), using the same incident wave inclined at 35° to 45° to the vertical, for example, the form of the reflected wave is similar to the preceding case. However, in this case the reflected wave is symmetric about a direction $\theta$ perpendicular to the inclined surface (and which therefore make the same angle with the vertical as the inclination to the horizontal, 30° for example). In this case the measurement of the wave reflected back along the direction of incidence reveals a value close to the maximum of the main lobe 2', therefore much greater than in the preceding case.

Consequently by measuring the reflected beam, preferably along the direction of incidence, it is possible to distinguish a flat, horizontal surface from an inclined one. The optimal measuring angle is that which offers the greatest contrast between the reflectivities of the horizontal and inclined surfaces; this generally lies between 0° and the angle of incidence. Ideally the angle of incidence should be as close as possible to the angle between the inclined and horizontal surfaces. Of course it is an advantage to have a reasonably precise estimation of this angle so as to direct the incident wave at the optimal angle. This angle must be greater than an angle $\theta_{min}$ below which the discrimination of a flat, horizontal surface and an inclined one is no longer possible, i.e. the intensity of the wave reflected from the horizontal and inclined surfaces are of the same order of magnitude.

Figure 2:
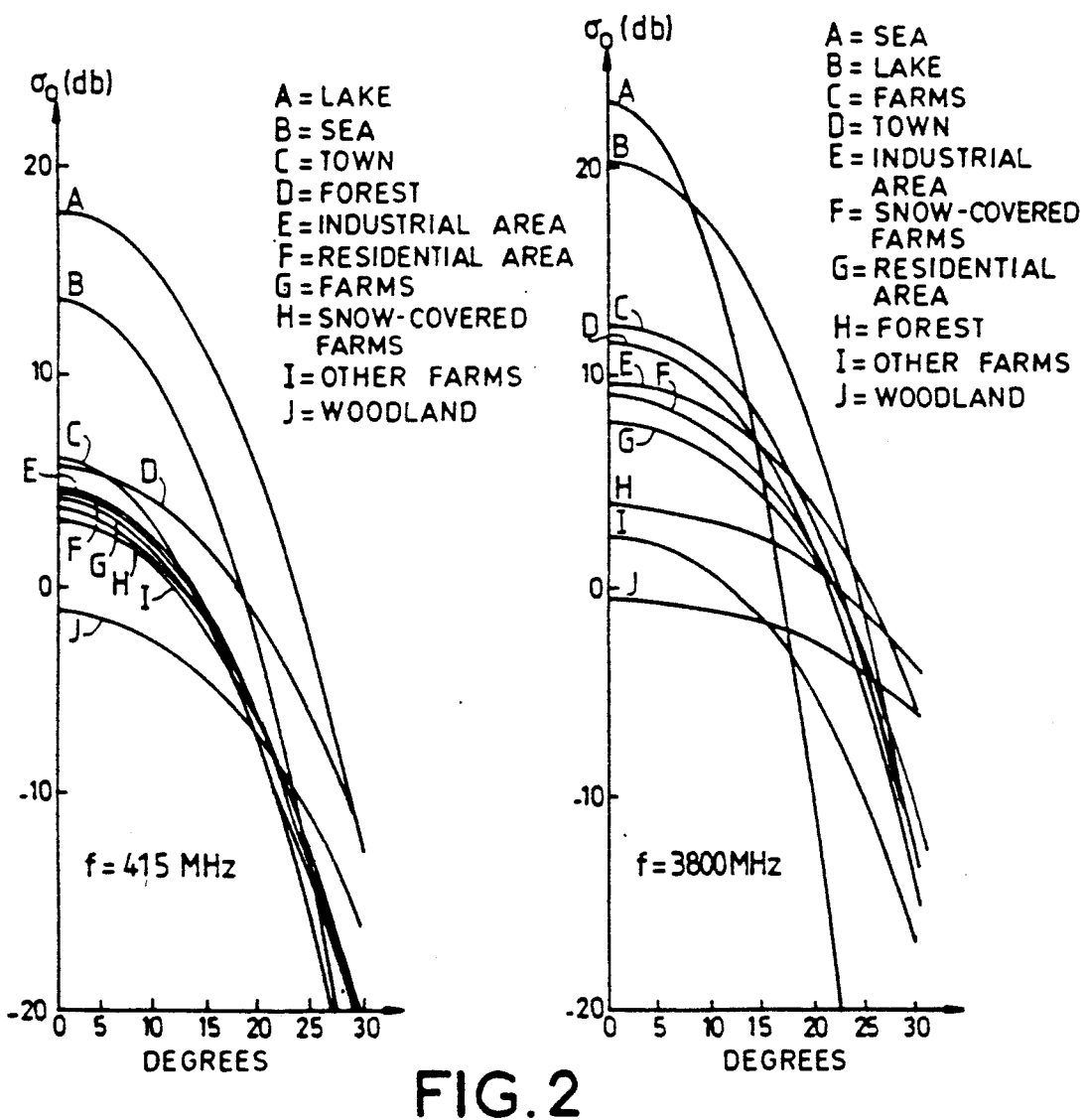
FIG. 2: a set of graphs representing the reflectivity of different types of ground as a function of the angle of incidence of a radar beam.

FIG. 2 shows two sets of curves showing the variations of the backscattering (in dB) from surfaces as a function of the angle of incidence $\theta$. The set of curves on the left is for a frequency of 415 MHz and that on the right for a frequency of 3800 MHz. We notice that, whatever the type of surface, the reflected signal varies strongly as a function of the angle of the incident wave, which means that it is always possible to discriminate a horizontal surface from a sufficiently inclined one (in the most favorable case, $\theta_{min}$ can be about 10° to 15°).

This procedure can therefore be applied for the detection of objects having one or more faces or facets inclined relative to the surrounding flat, horizontal surface. Similarly we can detect objects located on a non-horizontal plane provided at least one face of the object forms an angle with this surface of $\theta_{min}$ or more, the incident electromagnetic wave arriving as close as possible to the normal of this face. $\theta_{min}$ is for example greater than about 10°. The "objects" in question may be protrusion or hollows in the surrounding surface.

The angle of incidence of the radar wave must in all cases be as close as possible to the normal of the faces or facets of the objects. To achieve this, one solution might be to modify the direction of the incident electromagnetic beam. However, in this case the relatively poor sensitivity of known signal processing equipment and the highly precise localization required of the system imply an electromagnetic beam sufficiently focused that the surface of the object to be detected represents a non-negligible proportion of the sectional area of this beam. Such requirements would require extremely complex and costly means.

To avoid such costs the present invention does not process the signals coming from the area of the normal to the reflecting faces. Instead, the surface illuminated by the beam is divided into "distance analysis cells" whose dimensions are chosen to be similar to those of the objects to be detected. In practice, such analysis cells are obtained either using masking zones when the electromagnetic beam is of optical frequency, or using known techniques of distance resolution in the case of radar frequencies.

Figure 3:
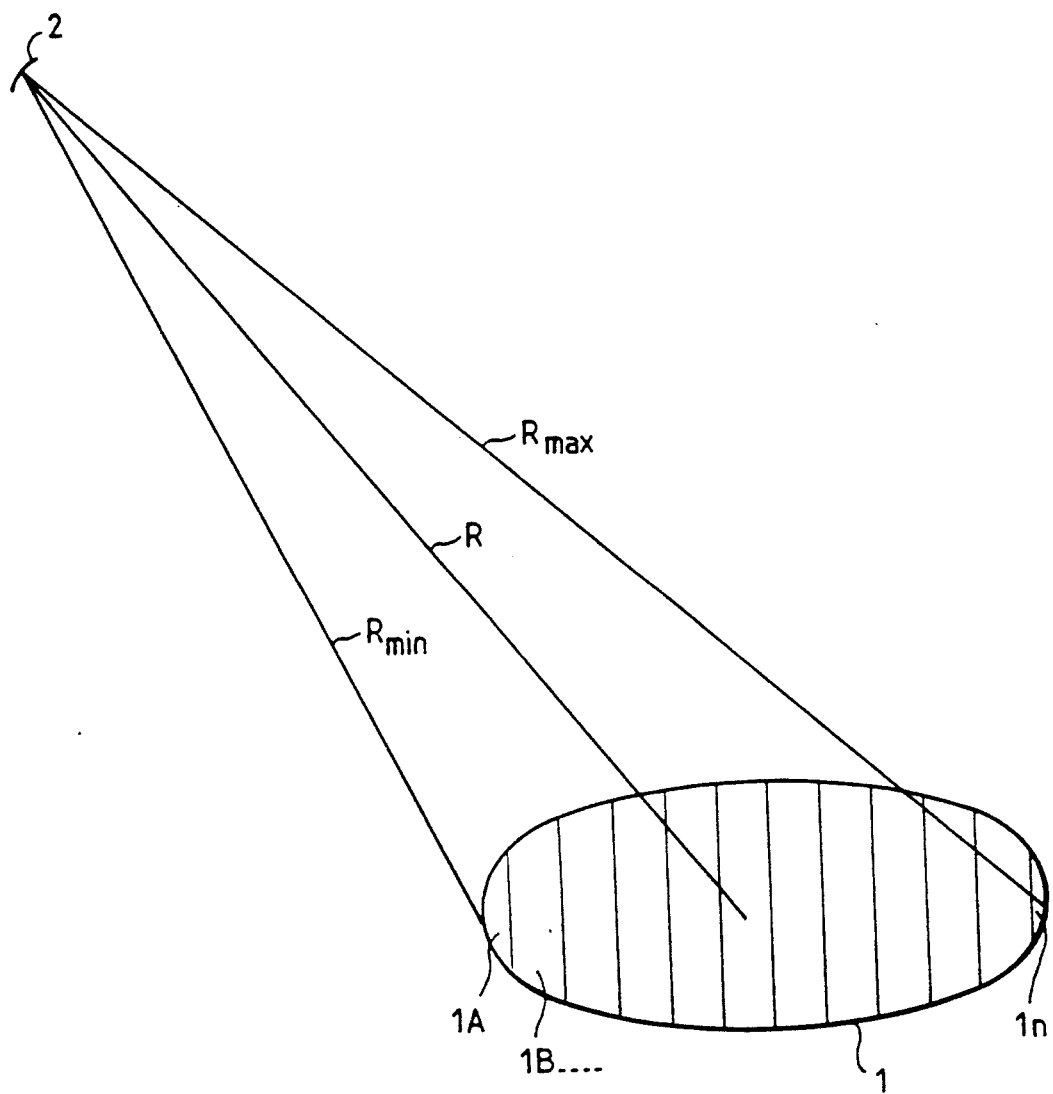
FIGS. 3 to 6: diagrams explaining the principle of the invention.

FIG. 3 shows schematically the formation on the ground of a spot or footprint formed by a radar beam emitted by an antenna 2 and divided into bands known as "distance cells" 1A to 1n. In the case where the dimensions of the spot are of the order of 10 m × 10 m, the number of cells can be about 5 to 10, about 10 m wide. In the case of antennas whose radiation patterns are as described below, the spot 1 has an elliptical shape and the cells lie perpendicular to the major axis, which is more or less parallel to the trajectory of the airborne vehicle. The distances from the antenna 2 to the cells of the ellipse range from $R_{min}$ to $R_{max}$, the distance to the central cell being R, remembering that the antenna is not vertically above the ellipse since the ellipse is formed ahead of the airborne vehicle in order to guide it.

In order to distinguish more finely the object to be detected, it is also possible to exploit other characteristics such as its texture, in particular by choosing the most suitable wavelength for the beam. For example, in the optical band, a wavelength in the near-infrared is suitable for observing "hot" objects, whereas radar wavelengths are more suitable for detecting the roughness of the object's surface (for example, the X band is used to distinguish grass, water and concrete).

Figure 4:
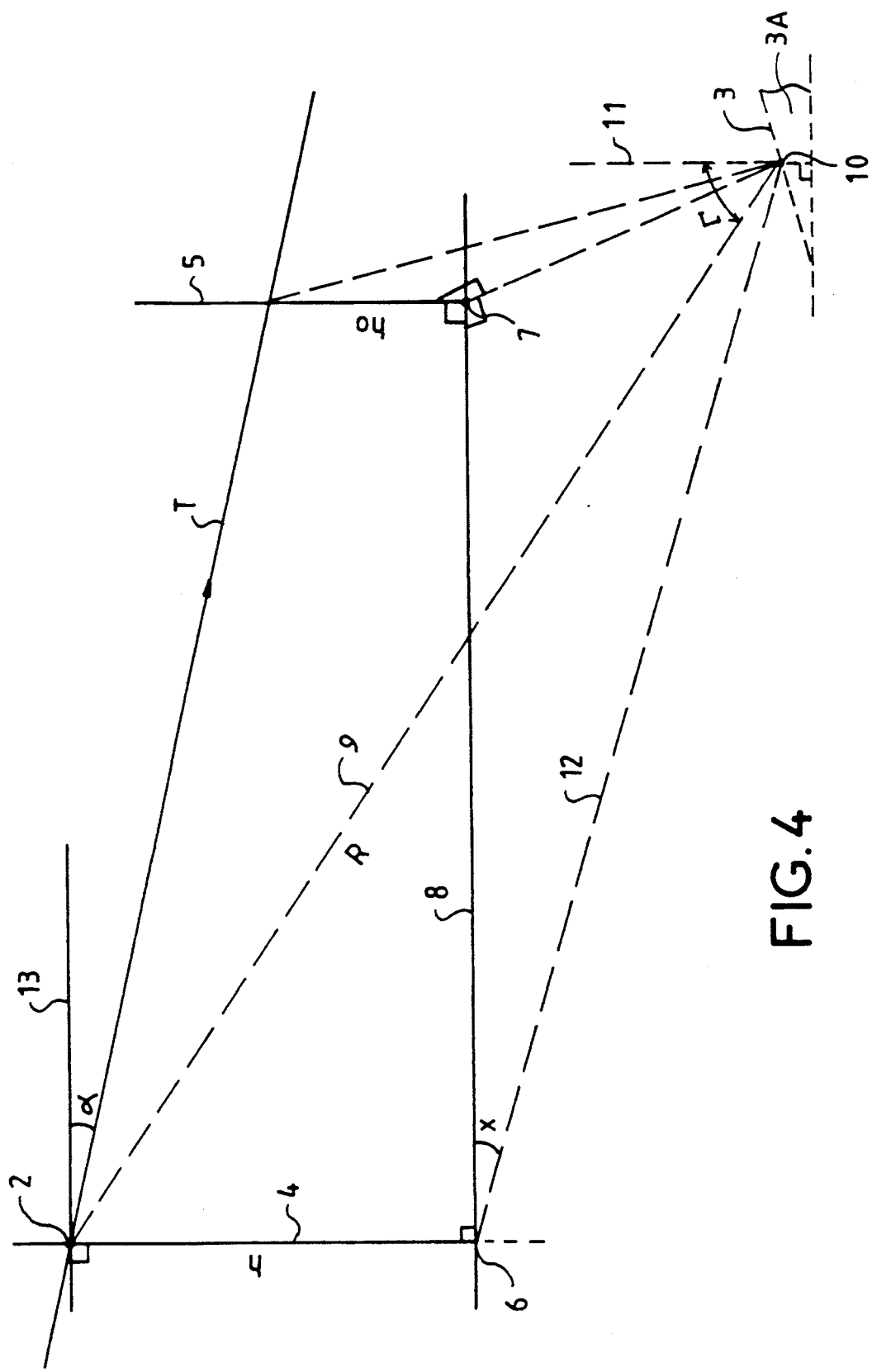
Figure 5:
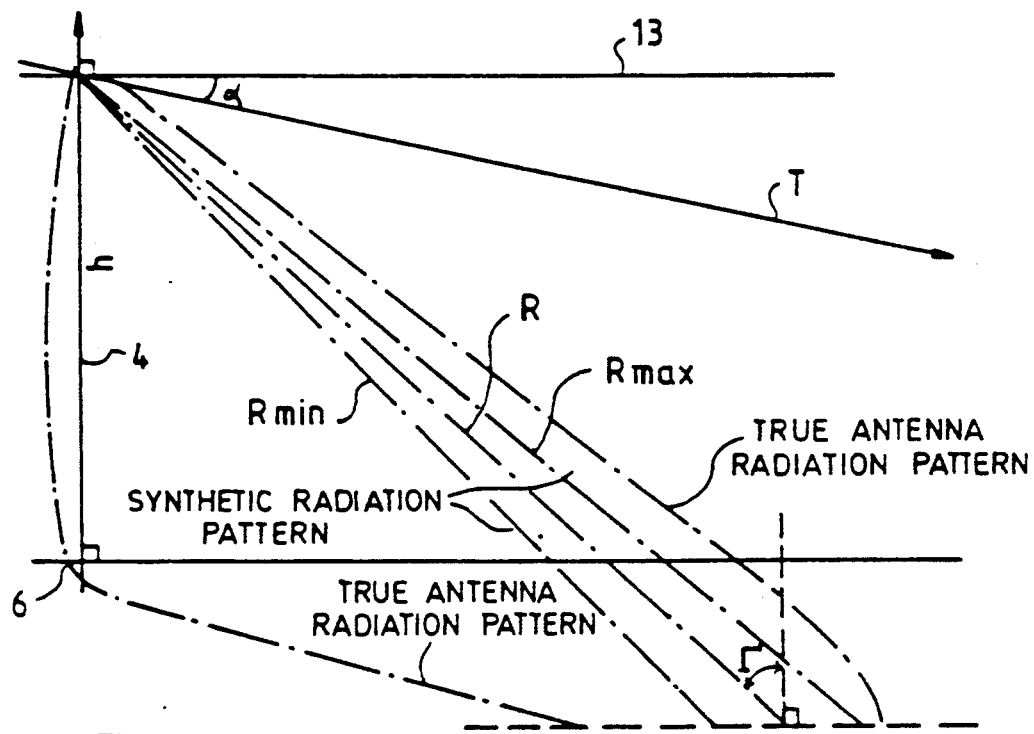
Figure 6:
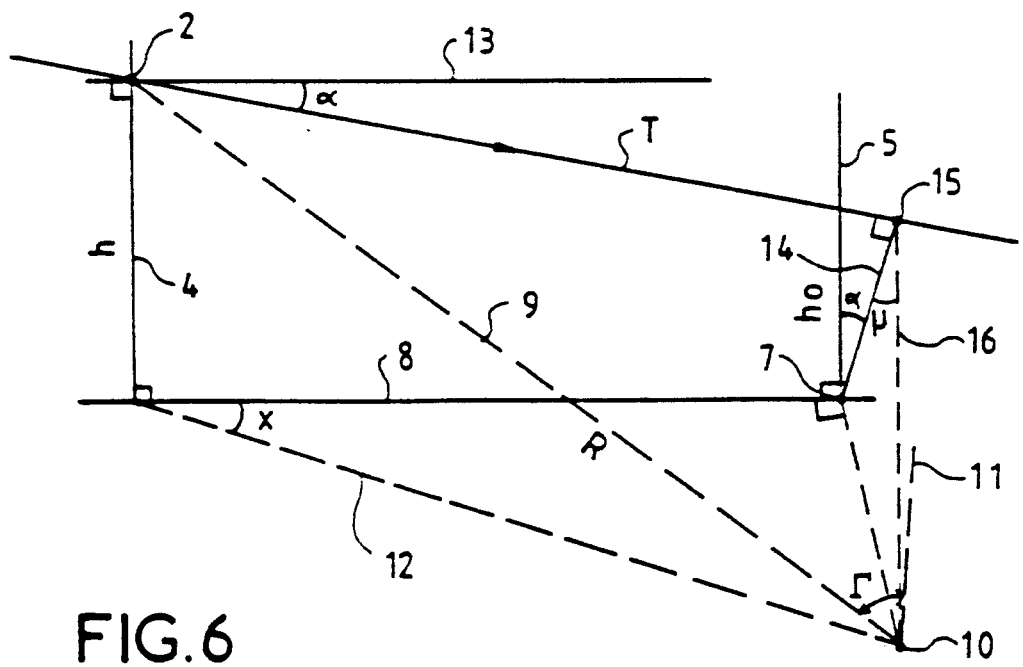

We shall now explain the localization procedure of the invention, making reference to FIGS. 4 to 6. To make use of the inclination of the faces of the objects to be located, we analyse the ground using an angle of incidence, relative to the vertical, of less than about 45° but more than about 15°, supposing that the faces form an angle with the horizontal of more than about 10°, yet not more than 40° to 50°. As mentioned above in reference to FIG. 2, the backscattering pattern from most known ground surfaces guarantees a reflected signal from surfaces inclined relative to the horizontal, within the limits defined earlier, of at least 15 dB compared with the signal from surrounding horizontal surfaces of similar area to the inclined surface, the reflected signal being measured using the transmission antenna.

In order that the localization beam has the suitable angle of incidence, regardless of the trajectory of the airborne vehicle carrying the radar transceiver, the beamwidth of the radar antenna 2 in the pitch plane (the vertical plane containing the trajectory of the vehicle) is advantageously about 30° or more, whereas the beamwidth in the roll plane is much less, as explained below. If the vehicle is to directly over-fly the located object, an anticipation of at least 500 m is required to enable effective terminal guidance. Consequently, the major axis of the elliptical area 1 illuminated on the ground by the beam has advantageously a length of at least 250 m. This surface 1 is divided into bands 1A to 1n as described above in reference to FIG. 3.

In order that the localization device can explore the largest possible surface using a directional antenna, the latter advantageously has a rolling movement about the longitudinal axis of the airborne vehicle on which it is mounted. If this vehicle is a cargo bomb, it is sufficient to cause it to rotate around its longitudinal axis. A time-division analysis is then carried out of the fluctuations of the radar echo from the ground and from the object to be localized during the lateral displacement of the radar footprint, this displacement being due to the rolling of the antenna.

The procedure according to the invention requires the continuous measurement of the altitude of the airborne vehicle carrying the measuring transceiver. If this altitude is known, it is possible to process, as explained below, only the part of the antenna radiation pattern, in the pitch direction of the airborne vehicle, corresponding to the reflectivity characteristic of the object to be located.

FIG. 4 shows very schematically the antenna 2 (in the plane of the drawing) and a face 3 (inclined at about 30°, for example, to the horizontal plane) of an object 3A lying in front of the plane of the drawing (i.e. towards the reader). In this figure, and in FIGS. 5 and 6, the items lying in the plane of the drawing are represented by solid lines, whereas those outside this plane are shown as hatched lines. The direction of the present trajectory T of the vehicle carrying the antenna 2 is in the plane of the drawing. The vertical lines passing through the instantaneous position of the antenna 2 at any time t before passing the object 3A, and through the antenna at a later point on the trajectory (closer to the object 3A) are respectively 4 and 5; these two vertical lines are also in the plane of the drawing. The altitudes of the antenna 2 measured along the verticals 4 and 5 are respectively h and $h_0$. A straight line 8 joins the bases 6 and 7 of the verticals 4 and 5. A distance R, measured along a straight line 9, separates the antenna and the center 10 of the face 3. The vertical line 11 passes through the point 10; the straight line 12 joints the points 6 and 10; the lines 9 and 11 form an angle $\Gamma$; a straight line 13 parallel to the line 8 passes through the antenna 2; the angle between T and the line 13 is $\alpha$.

As explained earlier, the elliptical spot formed on the ground by the beam from the antenna 2 can have a length of 250 m, for example, at a distance R of about 500 m. Yet, according to the invention, only the central part, for example a length of 50 m, is analysed, the rest of the spot being eliminated by distance filtering.

The antenna 2 having measured the altitude h, restricts its attention to the range of distances $R_{min}$ to $R_{max}$ (see FIG. 3) defined by:

$$R_{min} = 0.95 \cdot h / \cos(\Gamma_{est})$$

$$R_{max} = 1.05 \cdot H / \cos(\Gamma_{est})$$

The coefficients 0.95 and 1.05 are due to the selection of a 50 m analysis area at a range of R=500 m. $\Gamma_{est}$ is the estimated value of the angle $\Gamma$, supposing that an idea of the shape of the object sought has been previously acquired. This enables a "synthetic" directional pattern for the antenna to be calculated (beam delimited by the distances $R_{min}$ and $R_{max}$).

FIG. 5 contains some of the components of FIG. 4, with the same references, but without the object 3A. The dashed/dotted line delimits the true antenna directivity diagram in the pitch plane, which enables both h and R to be measured. The beamwidth of this diagram (at $-3$ dB) can be for example 45°.

The beamwidth of this diagram in the direction perpendicular to the trajectory is advantegeously about 3° to obtain an average contrast of 15 dB between the horizontal ground and the ground inclined at 30°. Less precise antenna directivity reduces the contrast to about 9 dB, which is still acceptable.

In view of the relatively narrow beamwidth of the antenna in the roll plane (3° as stated above), it is necessary to provide for rotational scanning in order to cover the whole of the area likely to contain the object 3A. We suppose that the trajectory of the airborne vehicle is not arbitrary and that the general location of the object is known. If this location is completely unknown, instead of increasing the beamwidth of the electromagnetic beam and/or the altitude of the vehicle, it is preferably where possible to arrange for the vehicle to scan adjacent parallel bands of ground. If the locating device rotates around the axis of the airborne vehicle, it is preferably to use several antennas placed around the edge of a rotating support so as to be able to exploit the dead time when certain antennas are pointing upwards. According to another variant of the invention, a single antenna could execute oscillating movements of limited amplitude so as to avoid pointing upwards. According to another variant, an electronic scanning antenna could be used to provide the necessary roll scanning.

FIG. 6 is used to explain the method of calculating the azimuth of the object to be localized, for example in order to correct the trajectory of the airborne vehicle so that is passes vertically over the object. In this figure, items found also in FIGS. 4 and 5 carry the same references.

In FIG. 6, x is the angle between lines 8 and 12. The perpendicular 14 from point 7 to the trajectory intercepts the latter at a point 15. A straight line 16 joins points 10 and 15. The angle between lines 5 and 14 is equal to $\alpha$ (i.e. the angle between 13 and T).

The angle between the lines 14 and 16 is $\mu$. This is equal to the roll angle of the beam of the antenna 2 when the center of the beam coincides with point 10; its value can be measured by sensors fixed to the antenna 2. These sensors could be for example of the type using wet mercury contacts. They are placed at different angular positions and in sufficient number to provide the required angular resolution.

We may write:

$$\sin(x) = \tan(\mu) \cdot \cos(\alpha) \cdot (\cotan(\Gamma) - \cos(x) \cdot \tan(\alpha))$$

To determine $\alpha$ we use the measured altitude $h_0$ of the trajectory T at its closest point to the object 3A. We then have:

$$\tan(\alpha) = \tan(\Gamma) \cdot (1 - h_0/h),$$

which gives:

$$\sin(x) = \tan(\mu) \cdot \frac{\cotan(\Gamma) - \cos(x) \cdot \tan(\Gamma) \cdot (1 - h_0/h)}{(1 + (\tan(\Gamma) \cdot (1 - h_0/h)^2)^{\frac{1}{2}}}$$

If x and $\mu$ are very small, and if we fix $\Gamma$ to 45° (with a tolerance of $\pm 5$° resulting from the fixing of $R_{min}$ and $R_{max}$, as described above), we can simplify the formula above as follows:

$$x = \mu \cdot (2h^2/h_0^2 - 2h/h_0 + 1)^{-\frac{1}{2}}$$

where $$h/h_0 = \tan(\Gamma)/(\tan(\Gamma) - \tan(\alpha))$$

This last formula reveals that when $\alpha$ varies from 20° to 40° the ratio $h/h_0$ increases from 1.5 to 5. Since we do not known $h_0$, it must be evaluated a priori. We note however that an error of $\pm 50\%$ in $h_0$ has a limited effect on the value of x in view of the strong variation of $h/h_0$ as a function of $\alpha$.

In practice, in the case of a cargo bomb for which $h_0$ is fixed at 300 m, for example, the angle x can be calculated from the following formula:

$$x = \mu \cdot (h^2/45000 - h/150 + 1)^{-\frac{1}{2}}$$

in which the distances are measured in meters.

In the determination of the angle x used for lateral trajectory correction the typical error resulting from this approximation on $h_0$ ($\mu$ and h being determined with sufficient precision) is less than $\pm 0.8$°. We note that the precision of the measurement of h does not affect the evaluation of $\Gamma$, since the distance R is more or less proportional to h.

Figure 7:
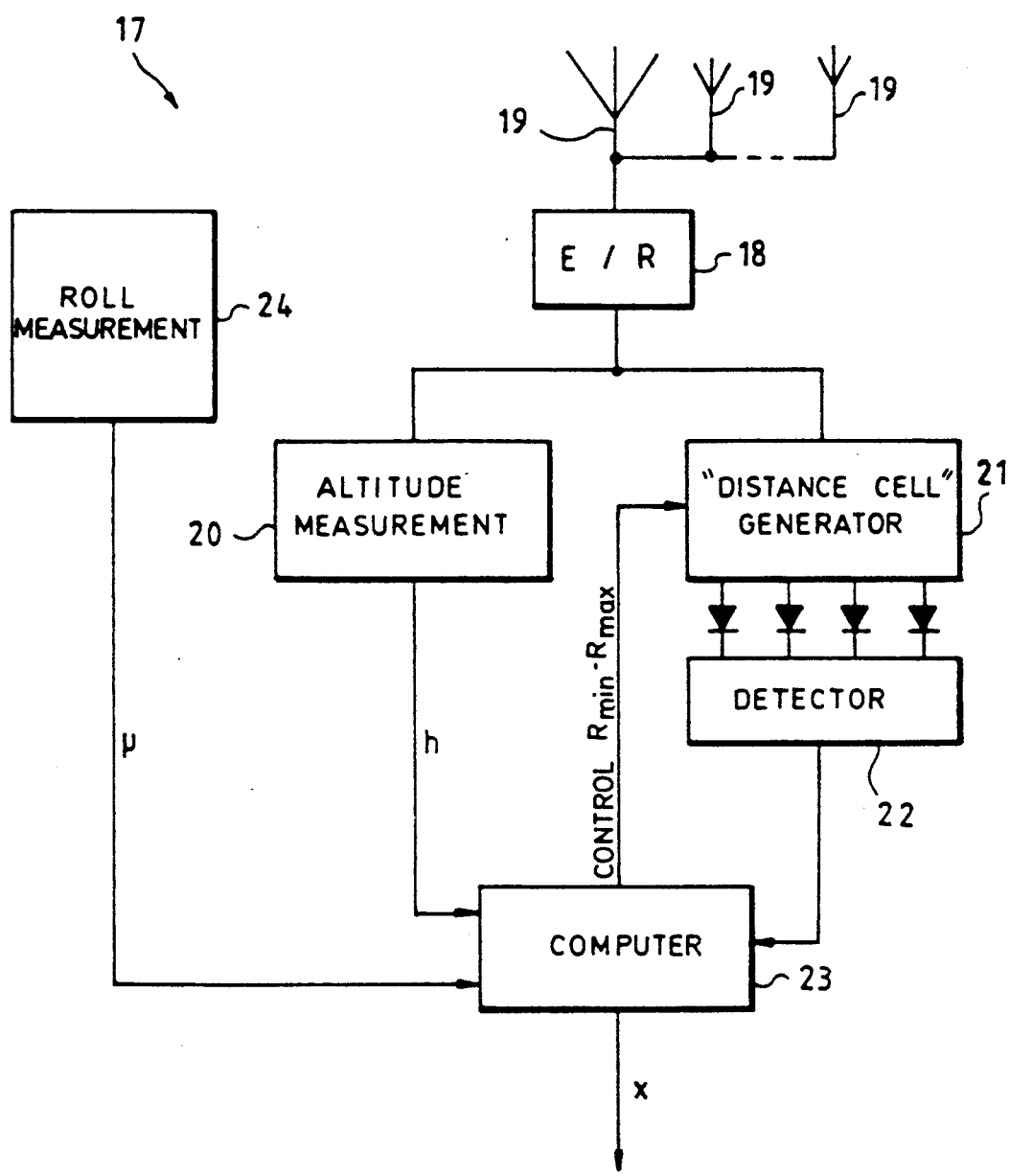
FIG. 7: a block diagram of a device making use of the procedure according to the invention.

FIG. 7 is a block diagram of an example of a device 15 making use of the procedure described above.

The device 17 includes a transceiver 18 connected to an antenna 19 (or several in the case of a rotating vehicle, if the ground is to be constantly scanned, as explained earlier).

The single antenna (or each antenna) possesses in the pitch plane of the airborne vehicle a wide radiation pattern, as shown in FIG. 5, so as to illuminate the ground vertically beneath the vehicle and at an angle of incidence close to Γ. In the roll plane of the vehicle, the field pattern of the antenna (or of each antenna) preferably has a beamwidth of less than 9°.

The transceiver 18 is connected to a device 20 used to measure the altitude and a known device 21 for generating "distance cells", determining the values of the distances between $R_{min}$ and $R_{max}$ (see FIG. 3). The generator 21 is connected via a detector 22 to a computer 23 to which is also connected the device 20. A device 24 for measuring the roll angle μ (for example, of the type using several wet mercury contacts arranged star-fashion around the rotational axis, as mentioned earlier) is also connected to the computer 23. This computer can be relatively simple since it only has to calculate the angle x using the formula defined above. The output from the computer, providing the value of x, is connected to a device (not shown) for correcting the trajectory of the vehicle. The detector 22 operates, in a known way, by integration and thresholding. If it detects a signal greater than a given threshold (for example, 15 dB above the average value of the signal reflected from various horizontal surfaces), it interprets this as the presence of a surface inclined relative to the horizontal, therefore an object to be localized. The computer 23 is also connected to the generator 21 so as to adjust the range of values $R_{min}$ to $R_{max}$ according to the height of the vehicle.

In the case where the airborne vehicle is a cargo bomb, the detection of a signal exceeding the threshold mentioned above is supposed to correspond to a target to be destroyed (for example, a hangar or an aircraft on the ground) and the determination of the angle x enables the trajectory to be corrected so that the vehicle passes as close as possible to the target. This reasoning supposes, of course, that before dropping the bomb, the topology of the ground is already known and that the underlying ground is practically flat, so that any inclined surface sufficiently large to reflect a signal detected by the detector 22 is practically sure to be the target sought. It is also assumed that the airborne vehicle is launched with relatively high precision towards the target, for example to pass not more than 500 m from it, so that the device according to the invention can assure the terminal guidance onto the target. We note that it is not necessary to measure R since its value is automatically determined by the detection criterion (angle Γ) and the measured value of h.

What is claimed is:

1. A Procedure for detecting and localizing objects surrounded by a substantially flat surface and having at least one substantially flat face inclined at an angle of more than about 10° with respect to the substantially flat surface, by an airborne vehicle over-flying the substantially flat surface, comprising the steps of:

scanning the substantially flat surface in front of the airborne vehicle with electromagnetic waves at predetermined angles of incidence;

detecting reflected electromagnetic wave signals of the scanning electromagnetic waves reflecting off the substantially flat scanned surface;

analyzing fluctuations of the reflected electromagnetic wave signals;

selecting for each angle of incidence of the scanning electromagnetic wave a range of distances centered on a value equal to a height of the airborne vehicle divided by a cosine of the each angle of incidence as measured from a vertical from the airborne vehicle to the substantially flat surface; and analyzing in the range of distances an intensity of the electromagnetic wave signals reflected by the substantially flat scanned surface, and when a maximum intensity of the reflected electromagnetic wave signals exceeds a predetermined threshold by reflecting off a reflecting face of the object, greater than that measured for the reflected electromagnetic wave when it is reflected from a surrounding surface at the same angle of incidence, determining a distance and azimuth of the reflecting face of the object, corresponding to the measured maximum intensity.

2. The procedure according to claim 1, wherein the substantially flat surface is flat ground.

3. The procedure according to claim 1, wherein the electromagnetic wave is also used to measure an altitude of the airborne vehicle above the substantially flat surface.

4. The procedure according to claim 1, wherein the electromagnetic wave is a radar wave having a beamwidth in a pitch plane greater than about 45° and less than about 9° in a roll plane.

5. The procedure according to claim 4, wherein the range of distance values is obtained by formation of distance cells, this range of distance varying with the height of the airborne vehicle.

6. The procedure according to any of the claims 1–5, wherein the predetermined threshold is greater by about 9 dB than the measured value of the electromagnetic wave reflected by the surrounding surface.

7. A device for detecting and localizing objects surrounded by a substantially flat surface and having at least one substantially flat face inclined at an angle of more than about 10° with respect to the substantially flat surface, by an airborne vehicle over-flying the substantially flat surface, comprising:

means for measuring a roll angle of the airborne vehicle;

at least one antenna for scanning the substantially flat surface in front of the airborne vehicle with electromagnetic waves at predetermined angles of incidence;

detecting means for detecting reflected electromagnetic wave signals of the scanning electromagnetic waves reflecting off the substantially flat scanned surface;

computing means for analyzing fluctuations of the reflected electromagnetic wave signals, for selecting for each angle of incidence of the scanning electromagnetic wave a range of distances centered on a value equal to a height of the airborne vehicle divided by a cosine of the each angle of incidence as measured from a vertical from the airborne vehicle to the substantially flat surface, and for analyzing in this range of distances an intensity of the electromagnetic wave reflected by the substantially flat scanned surface, and when a maximum intensity of the reflected electromagnetic wave exceeds a predetermined threshold by reflecting off a reflecting face of an object, greater than that measured for the electromagnetic wave when it is reflected from a surrounding surface at the same angle of incidence, determining a distance and azimuth of the reflecting face of the object, corresponding to the measured maximum intensity.

8. The device according to claim 7, wherein the at least one antenna is fixed on a mobile device rotating around an axis of trajectory of the airborne vehicle.

9. The device according to claim 7, wherein the means for measuring the roll angle of the airborne vehicle comprises a plurality of mercury contacts arranged at different angular positions around an axis of the trajectory of the airborne vehicle.

10. The device according to claim 7, wherein the electromagnetic wave has a beamwidth of less than about 9° in a roll plane, and of about 45° in a pitch plane, enabling an altitude of the airborne vehicle to be measured.

* * * * *